(12) United States Patent
Yamashita

(10) Patent No.: US 7,330,651 B2
(45) Date of Patent: Feb. 12, 2008

(54) OPTICAL AMPLIFYING APPARATUS, OPTICAL TRANSMISSION SYSTEM AND METHOD OF ADJUSTING OPTICAL TRANSMISSION LOSS

(75) Inventor: Makoto Yamashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/246,136

(22) Filed: Oct. 11, 2005

(65) Prior Publication Data

US 2006/0082868 A1   Apr. 20, 2006

(30) Foreign Application Priority Data

Oct. 15, 2004 (JP) ............................. 2004-301547
Dec. 17, 2004 (JP) ............................. 2004-365278

(51) Int. Cl.
  *H04B 10/08* (2006.01)
  *H04B 17/00* (2006.01)
  *H01S 3/00* (2006.01)

(52) U.S. Cl. .................................. 398/25; 359/337.13

(58) Field of Classification Search ........... 359/337.13; 398/25

See application file for complete search history.

(56) References Cited

U.S. PATENT DOCUMENTS 6,229,631 B1 * 5/2001 Sato et al. ..................... 398/30
6,599,039 B1 * 7/2003 Nakazato ....................... 398/25
6,600,594 B1 * 7/2003 Ko et al. ....................... 359/337
6,603,596 B2 * 8/2003 Inagaki et al. ............. 359/341.4
6,614,589 B2 * 9/2003 DeGrange et al. ........ 359/341.4
7,075,711 B2 * 7/2006 Haggans et al. .......... 359/341.2
2002/0154359 A1 * 10/2002 Tsuda et al. ................. 359/124
2003/0053196 A1 * 3/2003 Lelic et al. ............ 359/337.13
2003/0076578 A1   4/2003 Goto et al.
2004/0247319 A1 * 12/2004 Melman ....................... 398/65

FOREIGN PATENT DOCUMENTS

JP     2004119407 A   *   4/2004

\* cited by examiner

*Primary Examiner*—Deandra M Hughes
(74) *Attorney, Agent, or Firm*—Foley & Lardner LLP

(57) ABSTRACT

An optical amplifying apparatus connected mutually through an optical transmission line includes an optical detecting unit for detecting an input level of an amplified spontaneous emission (ASE) light, an optical amplifying unit for amplifying a signal light, and an optical attenuating unit for adjusting an attenuation level for the signal light, which being installed on an input side of the optical amplifying unit. The optical attenuating unit adjusts the attenuation level for the signal light, based on a difference between an output level of the ASE light outputted from the preceding optical amplifying apparatus and the input level of the ASE light inputted thereto.

8 Claims, 9 Drawing Sheets

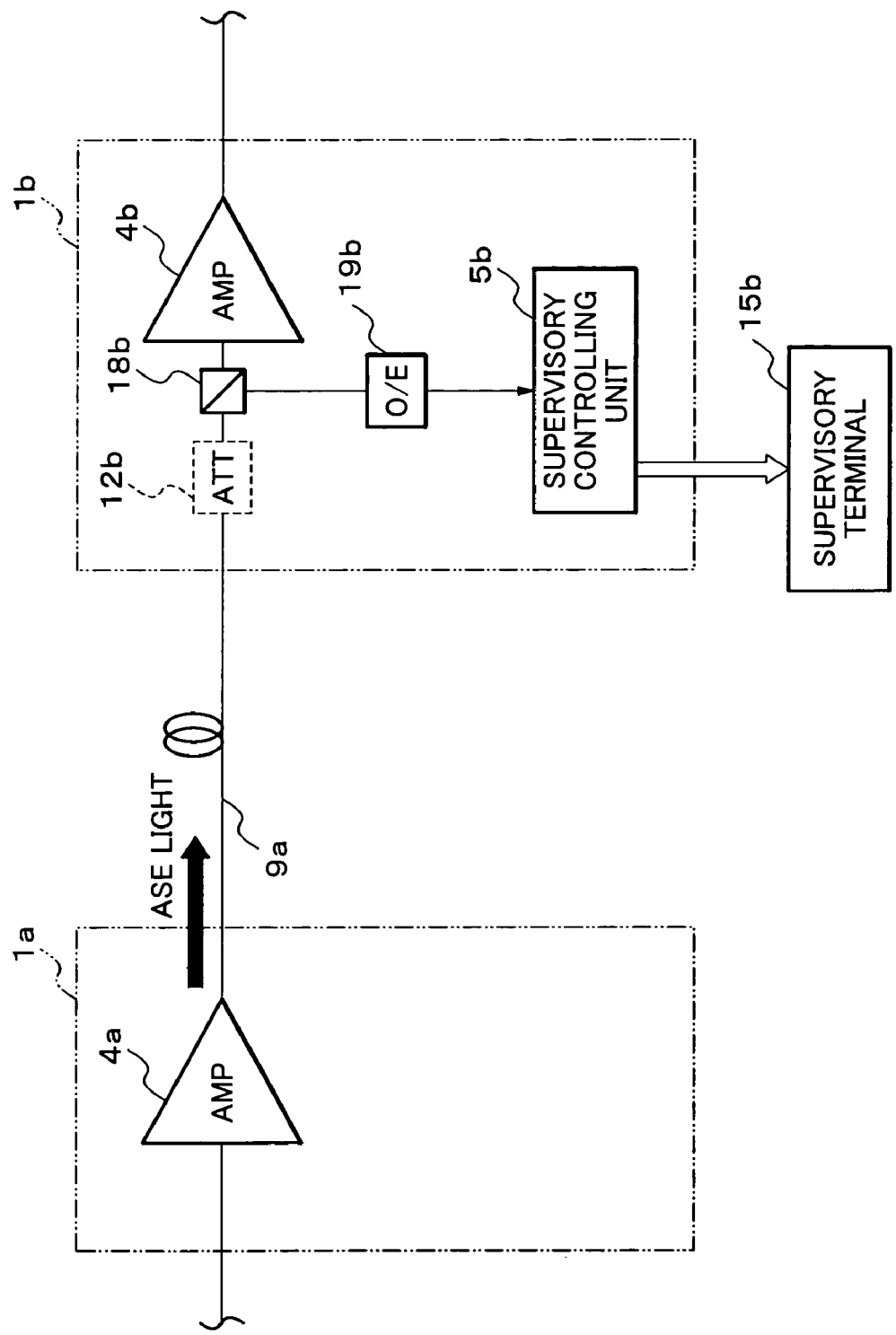

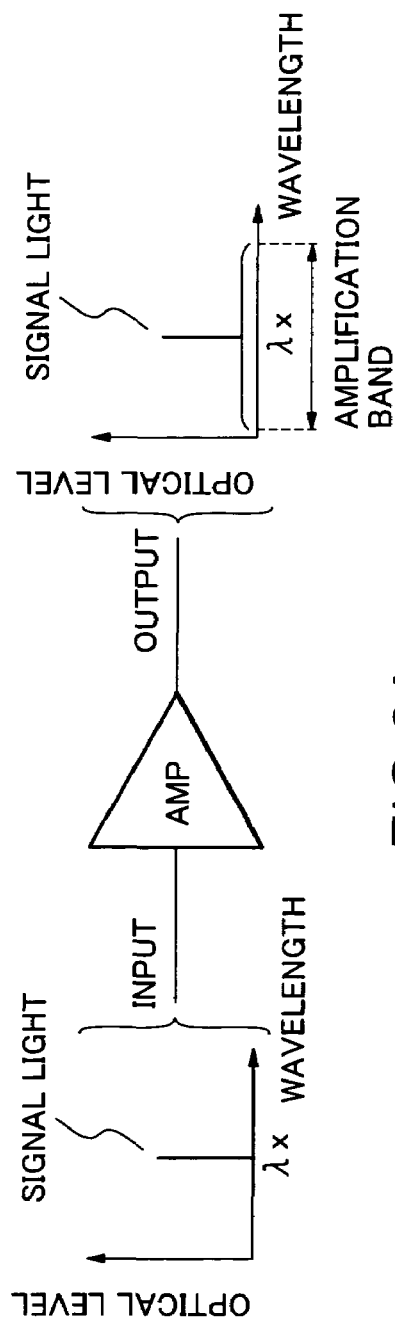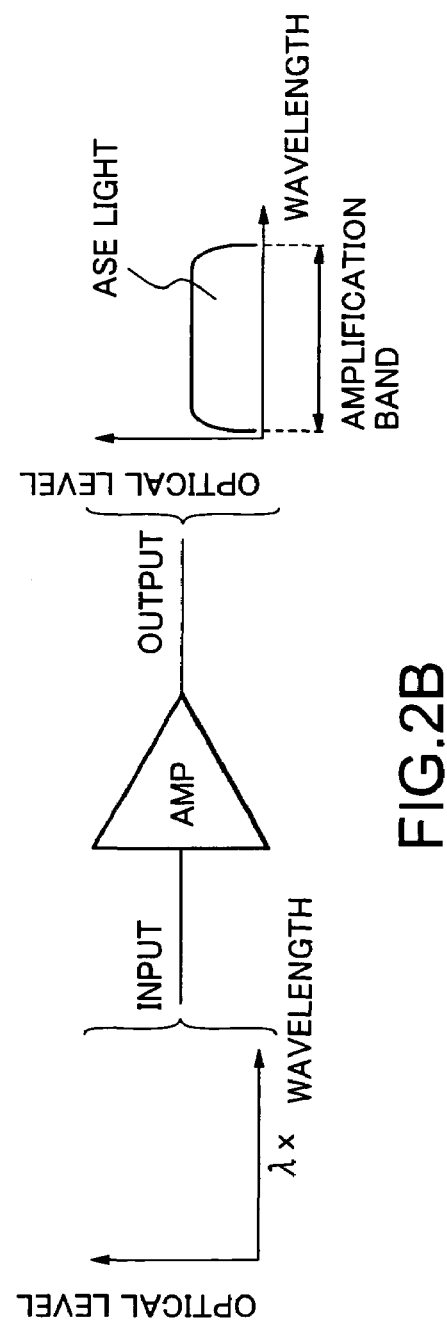

OPTICAL AMPLIFYING APPARATUS, OPTICAL TRANSMISSION SYSTEM AND METHOD OF ADJUSTING OPTICAL TRANSMISSION LOSS

BACKGROUND OF THE INVENTION

1. Field of the Invention

The present invention relates to an optical amplifying apparatus connected mutually through an optical transmission line, an optical transmission system and a method of adjusting an optical transmission loss thereof.

2. Description of the Related Art

Development of a long-distance optical transmission system has been advancing in recent years. The long-distance optical transmission system is realized by connecting a number of optical amplifying repeaters to a sequence in an optical transmission line. FIG. 9 shows one example of a wavelength division multiplexing optical transmission system related to the present invention. Line terminating equipments (LTEs) $50_1$ and $50_2$ are connected to each other through optical transmission lines $53_0$ to $53_n$. In the optical transmission lines $53_0$ to $53_n$, n of optical amplifying repeaters $51_1$ to $51_n$ is provided in multiple stages. The wavelength division multiplexing optical transmission system transmits a signal light while compensating for attenuation received by the optical transmission lines using the respective optical amplifying repeaters. The respective optical amplifying repeaters include optical amplifiers $52_1$ to $52_n$ and compensate for the attenuation by amplifying the signal light.

Next, with reference to FIG. 9, operations of the wavelength division multiplexing optical transmission system will be described. Signal lights $\lambda_1$ to $\lambda_m$ outputted from respective optical transmitters $54_1$ to $54_m$ in the line terminating equipment $50_1$ are multiplexed by an optical multiplexer 55 and outputted after amplified by an optical amplifier 57. The signal lights $\lambda_1$ to $\lambda_m$, which are transmitted and attenuated through the optical transmission line $53_0$, are amplified and compensated by the optical amplifier $52_1$ in the optical amplifying repeater $51_1$. Thereafter, the signal lights $\lambda_1$ to $\lambda_m$ are repeatedly attenuated and compensated by the respective optical transmission lines and the respective optical amplifiers, and are finally inputted to the line terminating equipment $50_2$ through the optical transmission line $53_n$. The inputted signal lights $\lambda_1$ to $\lambda_m$ are compensated for the last time by an optical amplifier 58 in the line terminating equipment $50_2$ and received by respective optical receivers $55_1$ to $55_m$ after demultiplexed by an optical demultiplexer 56.

Here, it is known that the optical amplifier has a noise figure (NF) changing with respect to an input level of the signal light (for example, US 2003/0076578 and the like). From the viewpoint of transmission quality, in order to obtain a desired noise figure, it is required to set the input level of the signal light within a certain range. However, there are a wide variety of transmission distances and optical transmission lines between optical amplifying repeaters, and there are various optical transmission losses. Thus, the level of the signal light inputted to the optical amplifier is never maintained constant. Therefore, it is demanded to easily adjust the input level of the signal light inputted to the optical amplifier or the optical transmission loss.

Particularly, at the time of introduction of the optical transmission system, in order to adjust the input level to the respective optical amplifiers, it is required to output at least one wavelength of signal light from the preceding optical amplifier. Accordingly, the input level is adjusted by receiving the signal light. The adjustment of the input level is performed, for example, by inserting an optical attenuator into an input part of the optical amplifier and setting an attenuation level.

As described above, in the conventional optical transmission system, at the time of introduction of the system, it is required to actually transmit the signal light in order to adjust the input level to the optical amplifier or the optical transmission loss. Thus, there is a problem that the input level of the optical amplifier or the optical transmission loss cannot be adjusted unless equipment and preparations for transmitting the signal light are completed.

SUMMARY OF THE INVENTION

In consideration of the above problems, it is an exemplary object of the present invention to provide an optical amplifier and an optical transmission system, which enable an optical transmission loss to be easily adjusted, and to provide a method of adjusting the loss easily.

An exemplary optical amplifying apparatus related to the present invention is connected mutually through an optical transmission line, and includes an optical detecting unit for detecting an input level of an amplified spontaneous emission (ASE) light, an optical amplifying unit for amplifying a signal light, and an optical attenuating unit for adjusting an attenuation level for the signal light, which being installed on an input side of the optical amplifying unit. And the optical attenuating unit adjusts the attenuation level for the signal light, based on a difference between an output level of the ASE light outputted from the preceding optical amplifying apparatus and the input level of the ASE light inputted thereto.

An exemplary optical transmission system related to the present invention includes a plurality of optical amplifying apparatuses connected through an optical transmission line. And the optical transmission line transmits a signal light, and each of the optical amplifying apparatuses amplifies the signal light. Furthermore, each of the optical amplifying apparatuses includes an optical detecting unit for detecting an input level of an amplified spontaneous emission (ASE) light, an optical amplifying unit for amplifying the signal light, and an optical attenuating unit for adjusting an attenuation level for the signal light, which being installed on an input side of the optical amplifying unit. And the optical attenuating unit adjusts the attenuation level for the signal light, based on a difference between an output level of the ASE light outputted from the preceding optical amplifying apparatus and the input level of the ASE light inputted thereto.

An exemplary method related to the present invention adjusts an input level to an optical amplifying apparatus connected mutually through an optical transmission line. And the method includes the steps of receiving an output level of an amplified spontaneous emission (ASE) light outputted from the preceding optical amplifying apparatus, detecting an input level of the ASE light inputted, and adjusting an attenuation level of an optical attenuating unit installed on an input side, based on a difference between the output level and the input level of the ASE light.

Other exemplary method related to the present invention adjusts an optical transmission loss of an optical transmission system including a plurality of optical amplifying apparatuses connected through an optical transmission line. And the method includes the steps of outputting an amplified spontaneous emission (ASE) light from a first optical amplifying apparatus and detecting an output level of the ASE light, transmitting the ASE light through the optical transmission line, inputting the ASE light to a second optical amplifying apparatus and detecting an input level of the ASE light, transmitting a signal light through the optical transmission line, and adjusting an attenuation level for the signal light inputted to the second optical amplifying apparatus, based on a difference between the output level and the input level of the ASE light.

As described above, according to the optical amplifiers the optical transmission system and the method of the present invention, the input level to the optical amplifier or the optical transmission loss is adjusted by use of an ASE (amplified spontaneous emission) light. Thus, an exemplary effect of the present invention is to enable the input level to the optical amplifier or the optical transmission loss to be adjusted without transmitting the signal light to the optical transmission line.

BRIEF DESCRIPTION OF THE DRAWINGS

The exemplary aspects, features and advantages of the present invention will become more apparent from the following detailed description when taken in conjunction with the accompanying drawings wherein:

FIG. 1 is a schematic diagram showing an optical transmission system according to a first exemplary embodiment of the present invention;

FIG. 2A is an explanatory view showing input/output characteristics of an optical amplifier when signal light is inputted;

FIG. 2B is an explanatory view showing input/output characteristics of the optical amplifier when no signal light is inputted;

DETAILED DESCRIPTION OF THE EXEMPLARY EMBODIMENTS

Figure 3:
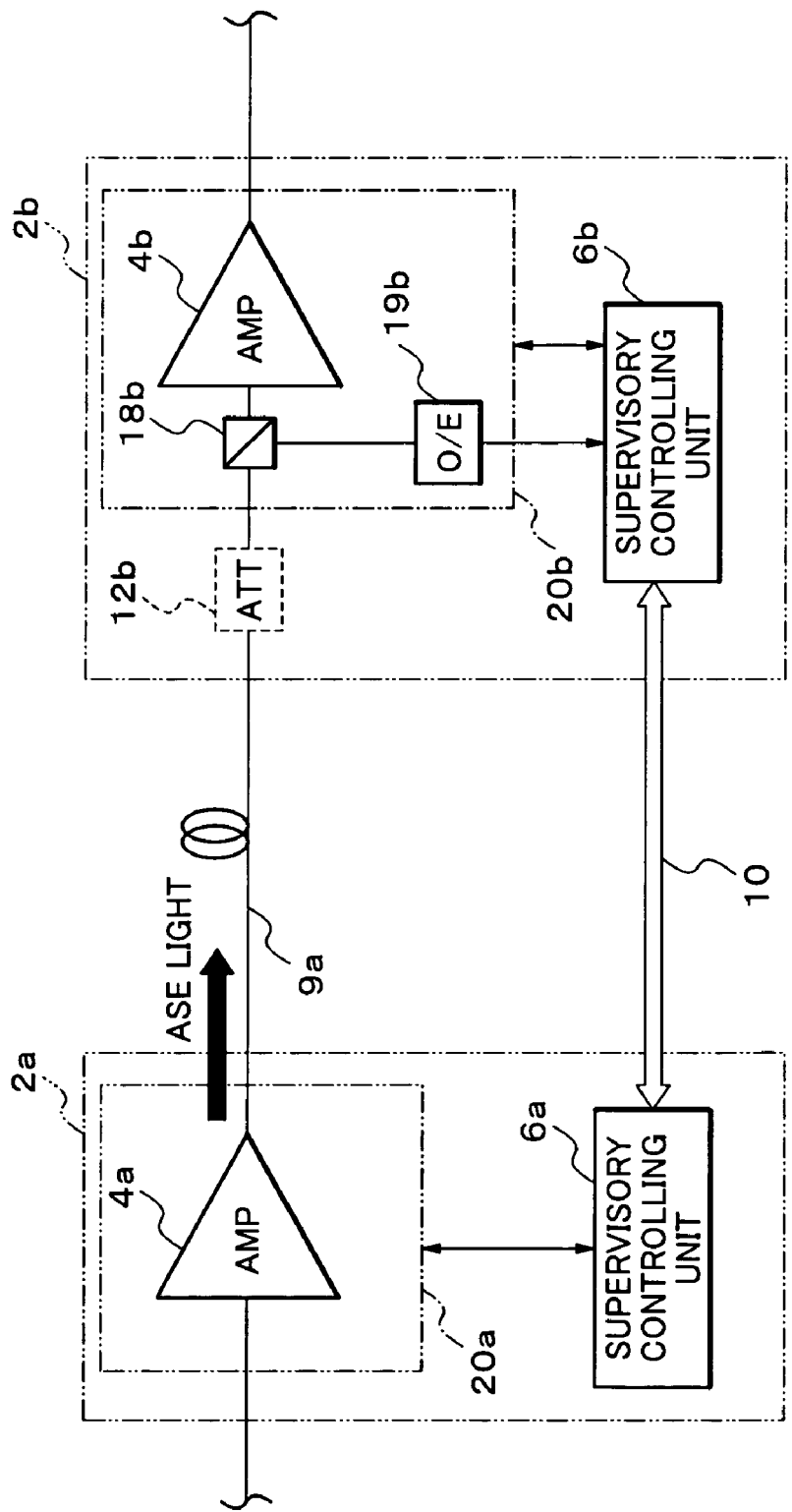
FIG. 3 is a schematic diagram showing an optical transmission system according to a second exemplary embodiment of the present invention.

With reference to the drawings, exemplary embodiments of the present invention will be described in detail below. Note that the exemplary embodiments described below show concrete examples for understanding the present invention, and the scope of the present invention is not limited only to those embodiments.

Note that an optical amplifying apparatus, an optical detecting unit, an optical amplifying unit, an optical attenuating unit and an optical blanching unit in the scope of claims will be specifically translated into an optical amplifying repeater, a photoelectric converter, an optical amplifier, an optical attenuator and an optical coupler, respectively. These are one example of the present invention, and the scope of claims of the present invention is not limited thereto.

FIG. 1 is a schematic diagram showing an optical transmission system according to a first exemplary embodiment of the present invention. FIGS. 2A and 2B are explanatory views showing input/output characteristics of an optical amplifier. FIG. 2A shows the case where a signal light is inputted, and FIG. 2B shows the case where no signal light is inputted. With reference to the drawings, the first exemplary embodiment will be described below.

FIG. 1 shows one section of a wavelength division multiplexing optical transmission system including a number of repeaters in multiple stages. In the optical transmission system of this embodiment, a plurality of optical amplifying repeaters is connected to each other through optical transmission lines. An optical amplifying repeater 1$b$ includes an optical amplifier 4$b$, an optical attenuator 12$b$, an optical coupler 18$b$, a photoelectric converter 19$b$, a supervisory controlling unit 5$b$ and the like. Moreover, the optical amplifying repeater 1$b$ is connected to a supervisory terminal 15$b$. Meanwhile, an optical amplifying repeater 1$a$ includes an optical amplifier 4$a$. The optical amplifying repeater 1$a$ may include the same components as those of the optical amplifying repeater 1$b$. Note that the optical amplifiers 4$a$ and 4$b$ amplify an optical signal. Meanwhile, the optical attenuator 12$b$ attenuates the optical signal.

First, since the optical attenuator 12$b$ is mounted after an attenuation level is calculated by adjusting an optical transmission loss, the attenuator is not yet mounted when adjustment of the optical transmission loss is started. In this state, an ASE light outputted from the optical amplifier 4$a$ in the optical amplifying repeater 1$a$ is inputted to the optical amplifying repeater 1$b$ through an optical transmission line 9$a$. The inputted ASE light is branched by the optical coupler 18$b$. Thereafter, one of the ASE light is inputted to the photoelectric converter 19$b$. The ASE light inputted to the photoelectric converter 19$b$ is converted into an electric signal. Here, a branching ratio of the optical coupler 18$b$ is previously determined. Thus, an input level of the optical amplifier 4$b$ can be indirectly monitored. This monitored information is transmitted to the supervisory controlling unit 5$b$. The supervisory controlling unit 5$b$ collects the monitored information and transmits the information to the supervisory terminal 15$b$. The input level of the optical amplifier 4$b$ can be easily confirmed on the supervisory terminal 15$b$ as the monitored information. Needless to say, the input level of the optical amplifier 4$b$ may be directly observed by use of an optical power meter or the like without using the supervisory terminal 15$b$. Note that an output level of the ASE light outputted from the optical amplifier 4$a$ in the optical amplifying repeater 1$a$ is also monitored in some way. For example, the output level of the ASE light may be monitored by providing a photoelectric converter also on an output side of the optical amplifier 4$a$.

Based on the monitored information described above, a necessary attenuation level of the optical transmission loss is calculated. Thereafter, the optical attenuator 12$b$ having the attenuation level is mounted on an input part of the optical amplifier 4$b$.

Here, the attenuation level (A [dB]) of the optical attenuator 12$b$ is set so as to allow an input level of signal light to have an optimum value with respect to the optical amplifier 4$b$. Specifically, the optical attenuator 12$b$ having such an attenuation level (A) is mounted.

Next, description will be given of a method of calculating the attenuation level of the optical attenuator 12b. The optical amplifier 4b has amplification bands as shown in FIGS. 2A and 2B. Here, if a signal light exists in the amplification band, the optical amplifier 4b amplifies the signal light (see FIG. 2A). On the other hand, if no signal light exists in the amplification band, the optical amplifier 4b outputs ASE light by amplifying noise elements (see FIG. 2B).

In this embodiment, the ASE light described above is actively utilized. Specifically, at the time of introduction of the optical transmission system, in order to adjust the optical transmission loss, the optical amplifier 4a is operated after the optical amplifiers 4a and 4b are connected to each other. In this event, there is no need to input signal light to the optical amplifier 4a, and the optical amplifier 4a transmits the ASE light to the optical transmission line 9a. At this point, the optical attenuator 12b is not yet mounted. Normally, in the optical amplifier 4a having an automatic level control (ALC), an output level per one wavelength of the signal light is previously determined. Thus, the input level of the subsequent optical amplifier 4b can be optimized by optimally adjusting the optical transmission loss. To be more specific, the attenuation level (A) of the optical attenuator 12b is determined based on an output level (P0: known) of the optical amplifier 4a, the input level (P1: actual measurement) of the optical amplifier 4b and an optimum loss value (L: known) of the optical transmission line 9a. The attenuation level is calculated by use of the following equation 1.

$$A = L - (P0 - P1) [dB] \quad \text{Equation 1}$$

Subsequently, the optical attenuator 12b having the attenuation level (A) obtained by the equation 1 is mounted on the input part of the optical amplifier 4b.

Note that the photoelectric converter 19b measures a sum of optical power levels in the amplification band. In this embodiment, a complicated measurement such as a measurement of optical power for each wavelength is not performed. Thus, components such as an optical filter having a branching function, an optical fiber grating and an arrayed waveguide grating (AWG) are not required. Therefore, a very simple configuration is adopted.

According to this embodiment, since the input level of the optical amplifier or the optical transmission loss is adjusted by use of the ASE light, time and equipment for transmitting a signal light are no longer required. Thus, this embodiment has an effect that the optical transmission loss can be easily adjusted even if it is difficult to transmit the signal light or preparations for the transmission are not complete. Particularly, if a number of the optical amplifiers are connected in multiple stages, only a specific section can be adjusted regardless of states of other sections. Moreover, the photoelectric converter may detect a sum of optical power levels of the ASE light in a predetermined amplification band. In this case, there is an effect that other components such as an optical filter are not required and the system can be realized with a simple configuration.

Figure 4:
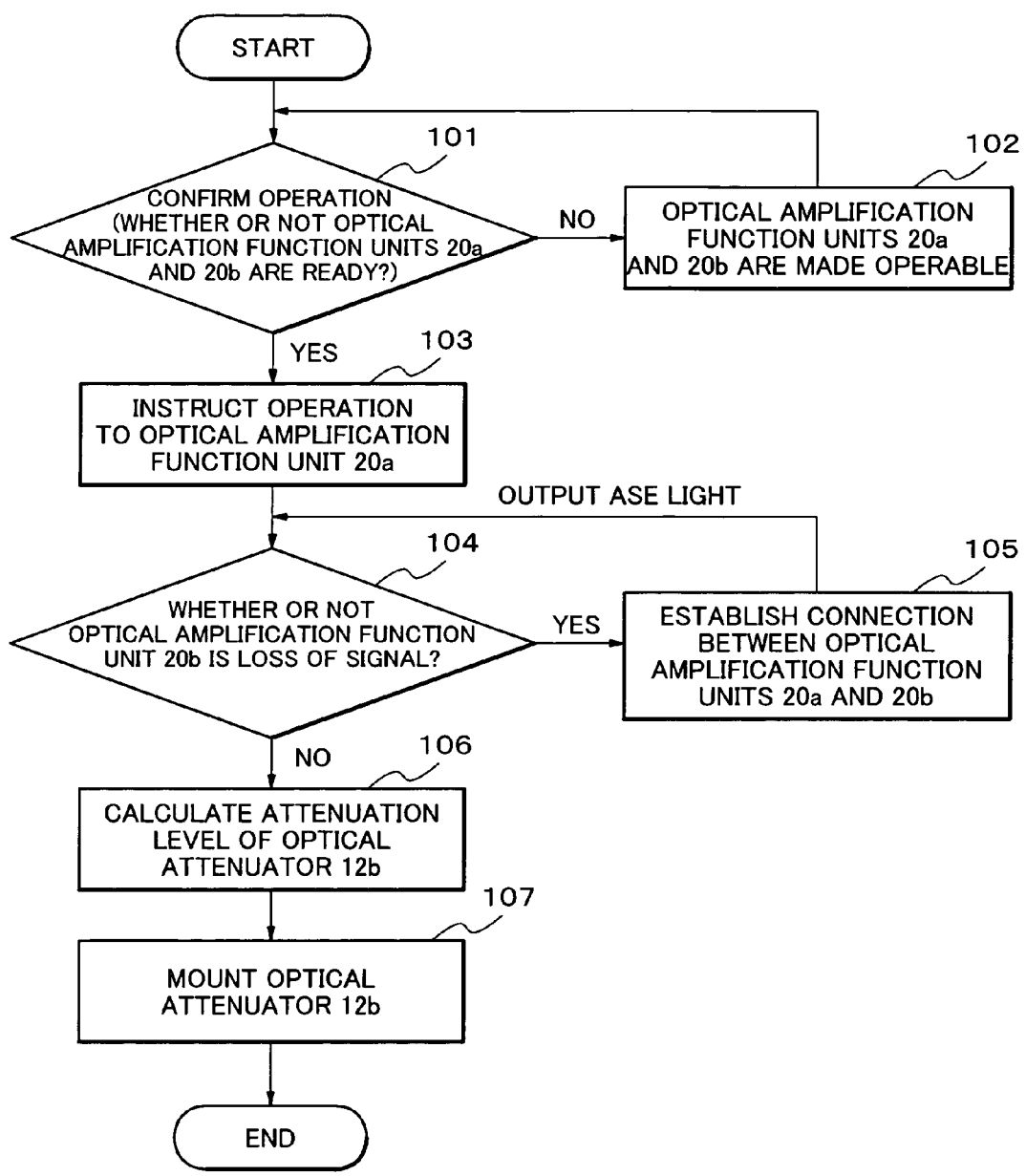
FIG. 4 is a flowchart showing a method of adjusting an optical transmission loss in the optical transmission system shown in FIG. 3.

FIG. 3 is a schematic diagram showing an optical transmission system according to a second exemplary embodiment of the present invention. FIG. 4 is a flowchart showing a method of adjusting an optical transmission loss in the optical transmission system shown in FIG. 3. With reference to the drawings, the second exemplary embodiment will be described below. Note that components having the same functions as those of FIG. 1 will be denoted by the same reference numerals in FIG. 3, and description thereof will be omitted.

In an optical amplifying repeater 2b according to this embodiment, an optical amplification function unit 20b includes an optical amplifier 4b, an optical coupler 18b, a photoelectric converter 19b and the like. Moreover, in an optical amplifying repeater 2a, an optical amplification function unit 20a includes an optical amplifier 4a and the like. Note that the optical amplification function unit 20a may include the same components as those of the optical amplification function unit 20b. Each of the optical amplification function units 20a and 20b has an optical amplification function (having a gain level and the like), an optical level monitoring function and the like. A supervisory controlling unit 6a supervises and controls the optical amplification function unit 20a. A supervisory controlling unit 6b supervises and controls the photoelectric converter 19b and the optical amplification function unit 20b.

First, since an optical attenuator 12b is mounted after an attenuation level is calculated by adjusting an optical transmission loss, the attenuator is not yet mounted when adjustment of the optical transmission loss is started. In this state, ASE light outputted from the optical amplifier 4a in the optical amplifying repeater 2a is inputted to the optical amplifying repeater 2b through an optical transmission line 9a. The inputted ASE light is branched by the optical coupler 18b. Thereafter, one of the ASE light is inputted to the photoelectric converter 19b. The ASE light inputted to the photoelectric converter 19b is converted into an electric signal. Here, a branching ratio of the optical coupler 18b is previously determined. Thus, an input level of the optical amplifier 4b can be indirectly monitored. This monitored information is transmitted to the supervisory controlling unit 6b. The supervisory controlling unit 6b obtains monitored information also from the supervisory controlling unit 6a in the optical amplifying repeater 2a through a network 10. The supervisory controlling units 6a and 6b may be able to communicate with each other through the network 10. Note that the network 10 is formed of a LAN (local area network) and the like, as an example.

Based on the monitored information described above, a necessary attenuation level of the optical transmission loss is calculated. Thereafter, the optical attenuator 12b having the attenuation level is mounted on an input part of the optical amplifier 4b. The attenuation level of the optical attenuator 12b is set so as to allow an input level of signal light to have an optimum value with respect to the optical amplifier 4b, as in the case of the first exemplary embodiment.

Next, description will be given of a method of adjusting the optical transmission loss at the time of introduction of the optical transmission system according to this embodiment, mainly based on FIG. 4.

When adjustment of the optical transmission loss is started, the optical attenuator 12b is not mounted. First, it is determined whether or not the optical amplification function units 20a and 20b are operable, each of which has the optical amplification function and the optical level monitoring function (Step 101). This information is obtained, for example, when the supervisory controlling units 6a and 6b receive mounting information and operation information on the respective optical amplification function units 20a and 20b. Unless both of the optical amplification function units 20a and 20b are operable, a standby state is set until the both units become operable (Step 102). When it can be confirmed between the supervisory controlling units 6a and 6b that the both of optical amplification function units 20a and 20b have become operable, the optical amplification function unit 20a is operated (Step 103). Thus, the optical amplification function unit 20a outputs an ASE light of a certain output level. Here, a signal light from an optical transmitter in an upstream of the optical transmission system does not have to be inputted to the optical amplification function unit 20a. Moreover, an input side of the optical amplification function unit 20a may not be connected to the optical transmission line. Only the optical amplifying repeaters 2a and 2b on both ends of the optical transmission line 9a for adjusting the optical transmission loss may be connected. Note that, even if a signal light from the optical transmitter in the upstream is inputted to the optical amplification function unit 20a, not the ASE light but the signal light is only outputted. Thus, there is no problem on the operations.

Subsequently, it is determined whether or not the optical amplification function unit 20b is LOS (loss of signal) (Step 104). In the case of the LOS, a connection of the optical transmission line 9a between the optical amplifying repeaters 2a and 2b is confirmed, and an optical fiber connection between the optical amplification function units 20a and 20b is surely performed (Step 105). When the optical fiber connection is established, the LOS of the optical amplification function unit 20b is resolved. Thus, based on a monitored value of an output level of the optical amplifier 4a and a monitored value of an input level of the optical amplifier 4b, an attenuation-level of the optical attenuator 12b is calculated as described above (Step 106). Thereafter, the optical attenuator 12b having the attenuation level corresponding to the calculation result is mounted on the input part of the optical amplifier 4b (Step 107).

According to this embodiment, as in the case of the first exemplary embodiment, time and equipment for transmitting a signal light are no longer required by using the ASE light. Thus, there is an effect that the optical transmission loss can be easily adjusted. Particularly, if a number of the optical amplifiers are connected in multiple stages, only a specific section can be adjusted regardless of states of other sections. Note that, also in this embodiment, the photoelectric converter may detect a sum of optical power levels of the ASE light in a predetermined amplification band, as in the case of the first exemplary embodiment. In this case, there is an effect that the system can be realized with a simple configuration.

Furthermore, in this embodiment, monitored information (including monitored values) on the preceding optical amplifier can be easily obtained by the supervisory controlling unit. Thus, there is also an effect that a desired attenuation level can be more easily calculated.

Figure 5:
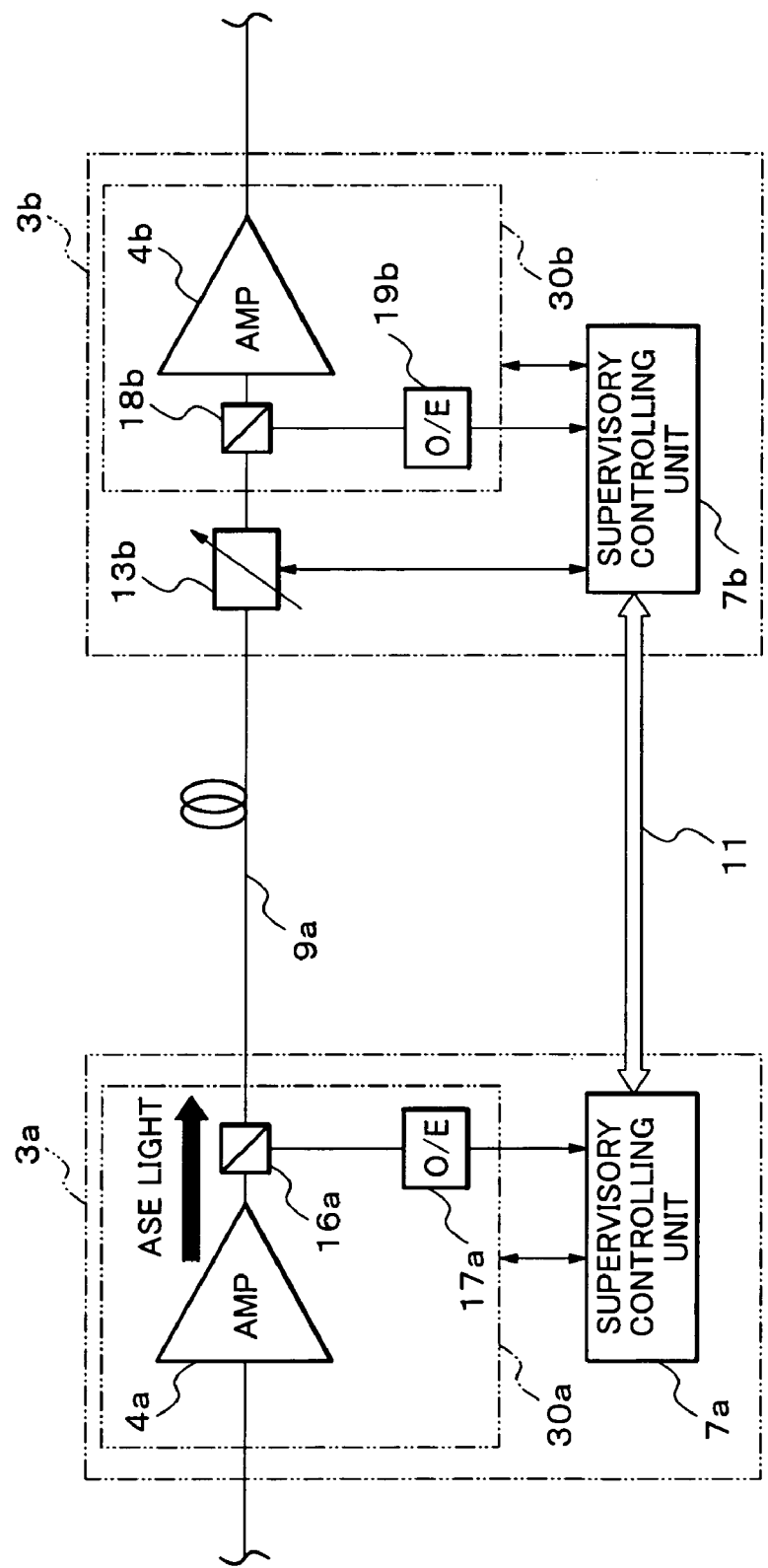
FIG. 5 is a schematic diagram showing an optical transmission system according to a third exemplary embodiment of the present invention.
Figure 6:
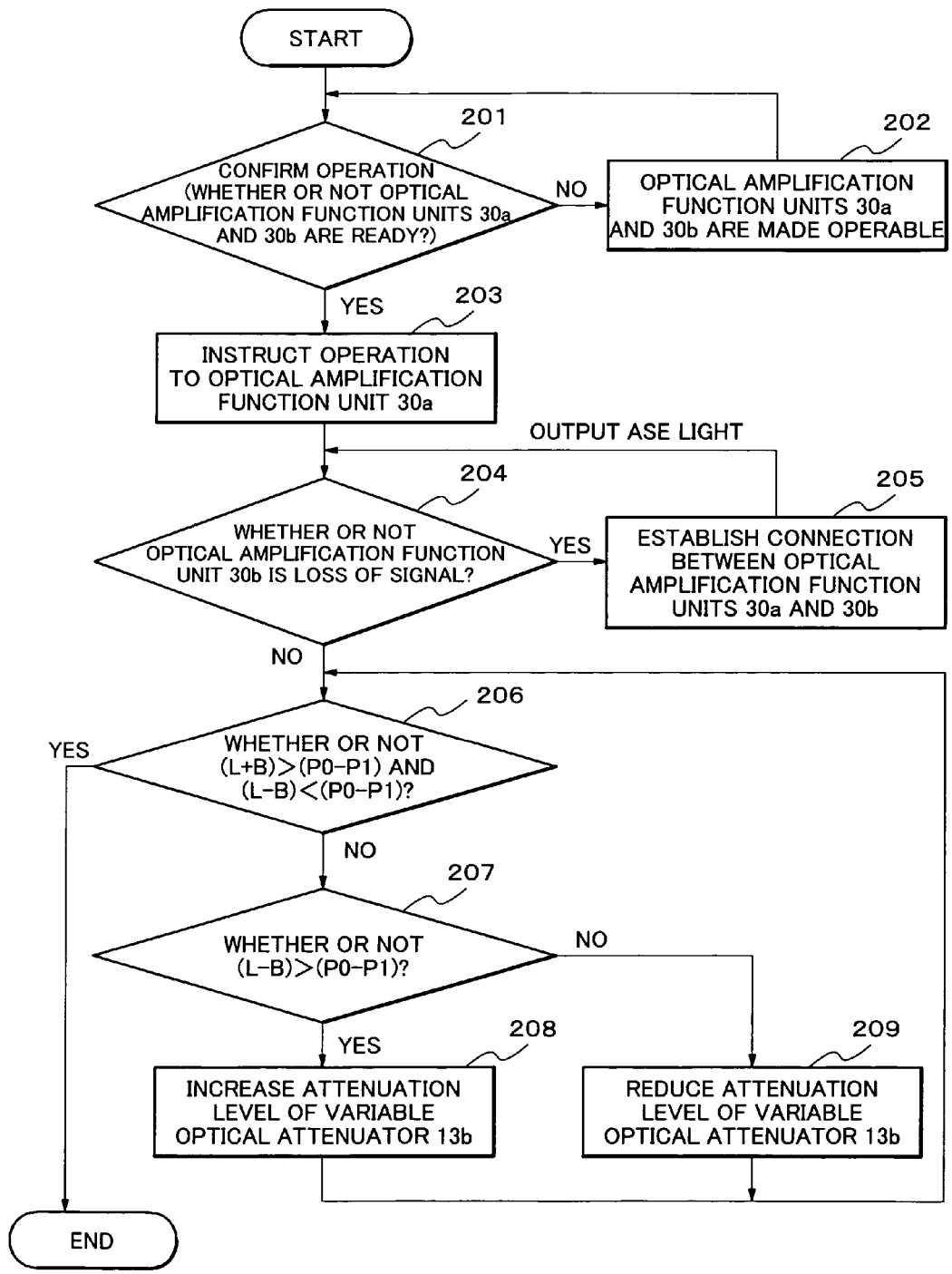
FIG. 6 is a flowchart showing a method of adjusting an optical transmission loss in the optical transmission system shown in FIG. 5.

FIG. 5 is a schematic diagram showing an optical transmission system according to a third exemplary embodiment of the present invention. FIG. 6 is a flowchart showing a method of adjusting an optical transmission loss in the optical transmission system shown in FIG. 5. With reference to the drawings, the third exemplary embodiment will be described below. Note that components having the same functions as those of FIG. 3 will be denoted by the same reference numerals in FIG. 3, and description thereof will be omitted.

In an optical amplifying repeater 3b according to this embodiment, a variable optical attenuator 13b is used instead of the optical attenuator in the second exemplary embodiment. An optical amplification function unit 30b includes an optical amplifier 4b, an optical coupler 18b, a photoelectric converter 19b and the like. A supervisory controlling unit 7b supervises or controls the variable optical attenuator 13b in addition to the photoelectric converter 19b and an optical amplification function unit 30b. In an optical amplifying repeater 3a, an optical amplification function unit 30a includes an optical amplifier 4a, an optical coupler 16a, a photoelectric converter 17a and the like. Moreover, a supervisory controlling unit 7a supervises or controls the photoelectric converter 17a and the optical amplification function unit 30a. Note that each of the optical amplification function units 30a and 30b has an optical amplification function, an optical level monitoring function and the like.

An ASE light outputted from the optical amplifier 4a in the optical amplifying repeater 3a is branched by the optical coupler 16a. Thereafter, one of the ASE light is inputted to the variable optical attenuator 13b in the optical amplifying repeater 3b through an optical transmission line 9a. The other ASE light is inputted to the photoelectric converter 17a and converted into an electric signal. Here, a branching ratio of the optical coupler 16a is previously determined. Thus, an output level of the optical amplifier 4a is indirectly monitored. This monitored information is transmitted to the supervisory controlling unit 7a. The variable optical attenuator 13b adjusts an attenuation level so as to allow an input level of the ASE light to have an optimum value with respect to the optical amplifier 4b. The ASE light outputted from the variable optical attenuator 13b is branched by the optical coupler 18b. Thereafter, one of the ASE light is inputted to the photoelectric converter 19b. The ASE light inputted to the photoelectric converter 19b is converted into an electric signal. Here, a branching ratio of the optical coupler 18b is previously determined. Thus, an input level of the optical amplifier 4b can be indirectly monitored. This monitored information is transmitted to the supervisory controlling unit 7b. The supervisory controlling unit 7b collects the monitored information and controls the variable optical attenuator 13b. The supervisory controlling unit 7b obtains an output level of the ASE light as monitored information from the supervisory controlling unit 7a in the optical amplifying repeater 3a through a network 11. The supervisory controlling units 7a and 7b may be able to communicate with each other through the network 11. Note that the network 11 is formed of a LAN and the like, as an example.

Next, description will be given of a method of adjusting the optical transmission loss at the time of introduction of the optical transmission system according to this embodiment, mainly based on FIG. 6.

First, it is determined whether or not the optical amplification function units 30a and 30b are operable, each of which has the optical amplification function and the optical level monitoring function (Step 201). This information is obtained, for example, when the supervisory controlling units 7a and 7b receive mounting information and operation information on the respective optical amplification function units 30a and 30b. Unless both of the optical amplification function units 30a and 30b are operable, a standby state is set until the both units become operable (Step 202). When it can be confirmed between the supervisory controlling units 7a and 7b that the both of optical amplification function units 30a and 30b have become operable, the optical amplification function unit 30a is operated (Step 203). Thus, the optical amplification function unit 30a outputs an ASE light of a certain output level. Here, a signal light from an optical transmitter in an upstream of the optical transmission system does not have to be inputted to the optical amplification function unit 30a. Moreover, an input side of the optical amplification function unit 30a may not be connected to the optical transmission line. Only the optical amplifying repeaters 3a and 3b on both ends of the optical transmission line 9a for adjusting the optical transmission loss may be connected. Note that, even if a signal light from the optical transmitter in the upstream is inputted to the optical amplification function unit 30a, not the ASE light but the signal light is only outputted. Thus, there is no problem on the operations. Subsequently, it is determined whether or not the optical amplification function unit 30b is LOS (loss of signal) (Step 204). In the case of the LOS, a connection of the optical transmission line 9a between the optical amplifying repeaters 3a and 3b is confirmed, and an optical fiber connection between the optical amplification function units 30a and 30b is surely performed (Step 205). When the optical fiber connection is established, the LOS of the optical amplification function unit 30b is resolved.

Subsequently, based on an output level monitored value "P0" of the optical amplifier 4a, an input level monitored value "P1" of the optical amplifier 4b and an optimum loss value "L" of the optical transmission line 9a, it is determined whether or not "P0−P1" is set within a certain range "L±B" with respect to the optimum loss value "L". Here, "B(>0)" is a tolerance. Specifically, it is determined whether or not the equation 2 is established (Step 206). As a result, if "P0−P1" is not set within the certain range with respect to the optimum loss value "L", the attenuation level of the variable optical attenuator 13b is changed so as to set the actually measured loss value "P0−P1" within the certain range "L±B". For example, if the equation 3 is established, the attenuation level of the variable optical attenuator 13b is increased (Steps 207 and 208). On the other hand, if the equation 4 is established, the attenuation level of the variable optical attenuator 13b is reduced (Steps 207 and 209). When "P0−P1" is set within the certain range "L±B" with respect to the optimum loss value "L", control is finished (Step 206).

$$(L+B)>(P0-P1) \text{ and } (L-B)<(P0-P1) \quad \text{Equation 2}$$

$$(L-B)>(P0-P1) \quad \text{Equation 3}$$

$$(L+B)<(P0-P1) \quad \text{Equation 4}$$

Note that the optical couplers 16a and 18b and the photoelectric converters 17a and 19b branch and receive the ASE light. Thus, as to the above components, it is preferable to use those less dependent on the wavelength across a band wider than a signal light band (in other words, in an amplification band). A monitoring accuracy (attenuation level control accuracy) can be improved that way.

Although the flow when the system is introduced has been described above, the variable optical attenuator 13b may be controlled by the same flow also while the system is operated. In the variable optical attenuator 13b, based on the output level monitored value of the optical amplifier 4a and the input level monitored value of the optical amplifier 4b, an optimum attenuation level is calculated and fed back. Thus, even if the loss of the optical transmission line 9a between the optical amplifying repeaters 3a and 3b is changed, the optical transmission loss can be properly adjusted.

According to this embodiment, the attenuation level of the variable optical attenuator is determined by obtaining the output level of the ASE light in the preceding optical amplifier via the network. Thus, in addition to the effects achieved in the above-described embodiments, there is an effect that adjustment of the optical transmission loss can be automatically performed. Note that, even if the optical transmission loss is changed while the optical transmission system is operated, the attenuation level of the variable optical attenuator can be automatically changed. Thus, there is an effect that the system can always be operated with a proper optical transmission loss.

Figure 7:
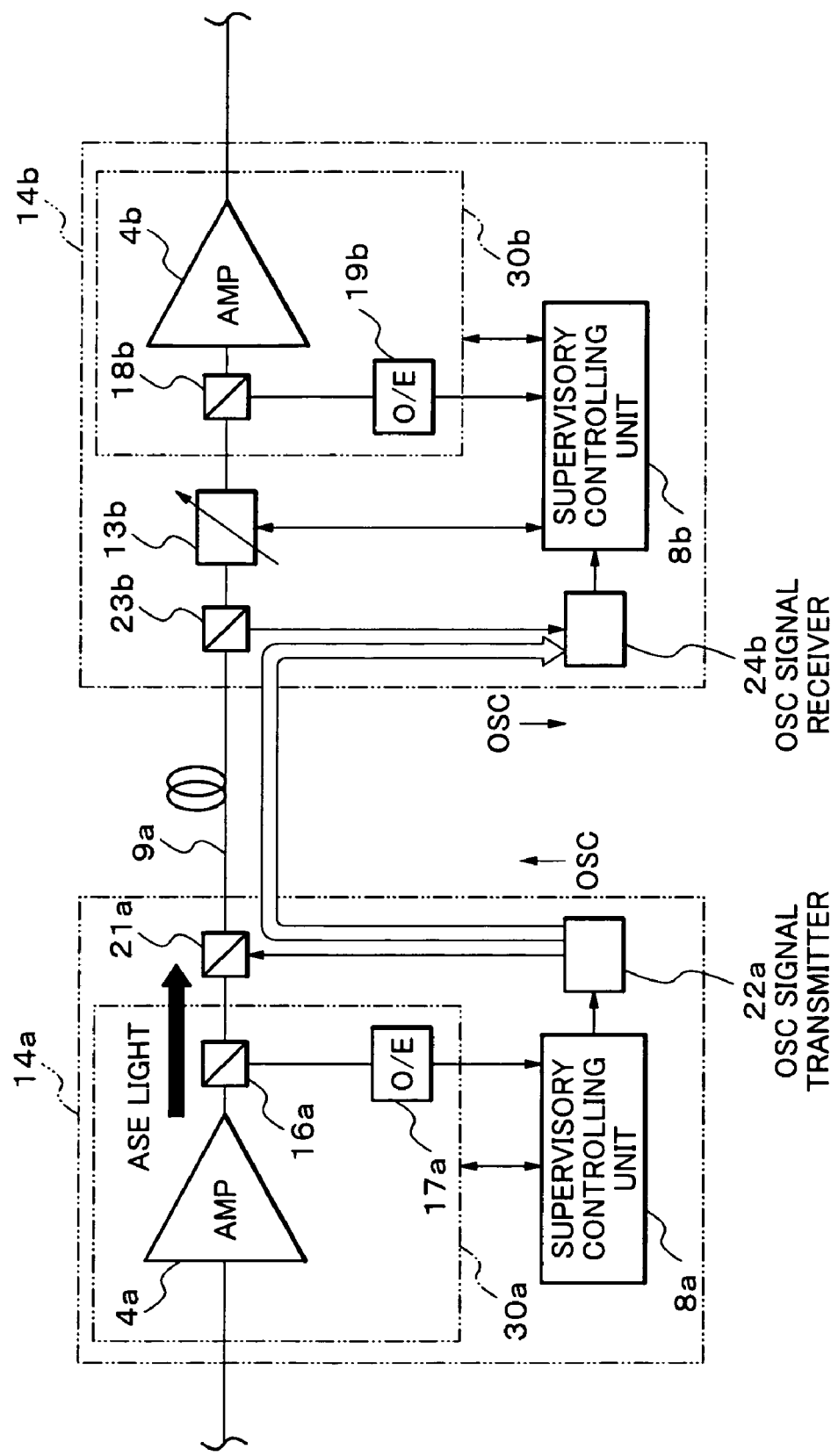
FIG. 7 is a schematic diagram showing an optical transmission system according to a fourth exemplary embodiment of the present invention.
Figure 8:
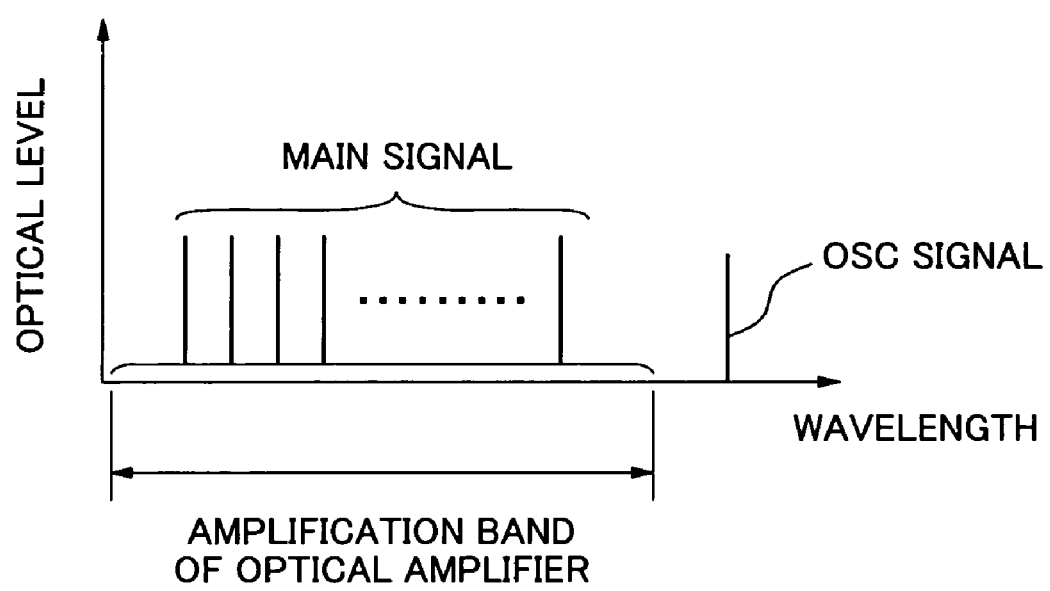
FIG. 8 is an explanatory view showing an OSC (optical supervisory channel) signal.
Figure 9:
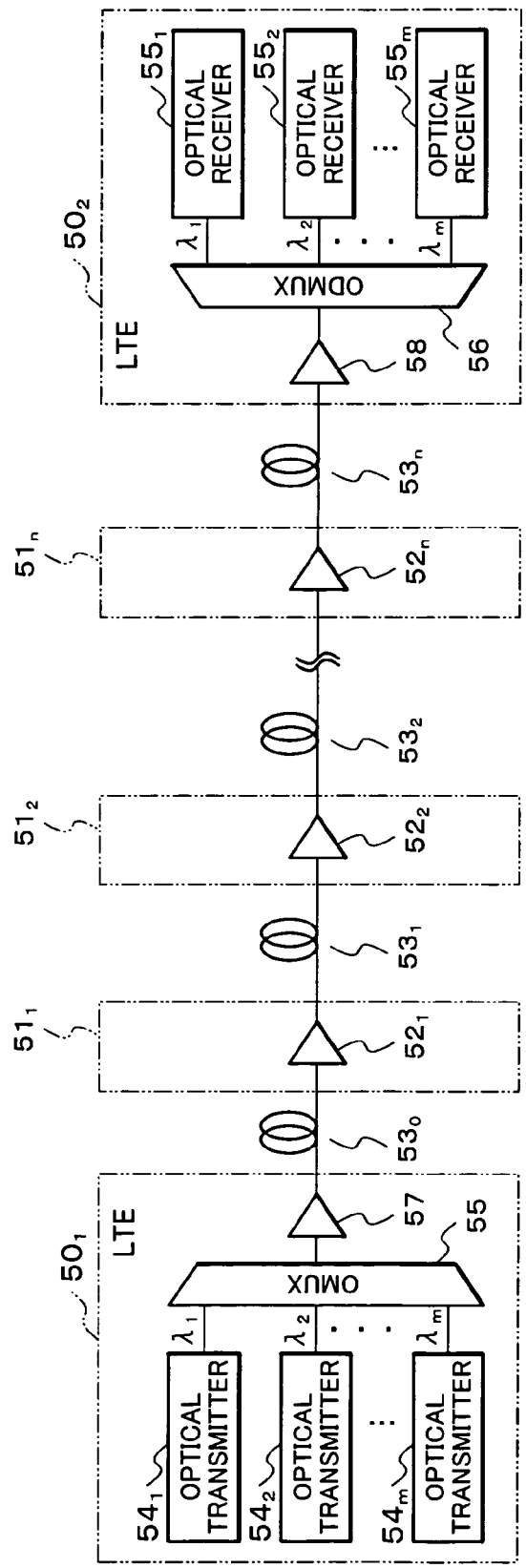
FIG. 9 is a schematic diagram showing an optical transmission system related to the present invention.

FIG. 7 is a schematic diagram showing an optical transmission system according to a fourth exemplary embodiment of the present invention. FIG. 8 is an explanatory view showing an OSC (optical supervisory channel) signal. With reference to the drawings, the fourth exemplary embodiment will be described below. Note that components having the same functions as those of FIG. 5 will be denoted by the same reference numerals in FIG. 5, and description thereof will be omitted.

An optical amplifying repeater 14b according to this embodiment includes an optical coupler 23b and an OSC (optical supervisory channel) signal receiver 24b besides a variable optical attenuator 13b, an optical amplification function unit 30b and a supervisory controlling unit 8b. The optical coupler 23b demultiplexes an OSC signal from a signal light (main signal) and an ASE light. An optical amplifying repeater 14a includes an optical coupler 21a and an OSC signal transmitter 22a besides an optical amplification function unit 30a and a supervisory controlling unit 8a. The optical coupler 21a multiplexes the OSC signal with the signal light and the ASE light.

Since the flow of the ASE light is the same as that in the third exemplary embodiment, description thereof will be omitted. In the third exemplary embodiment, monitored information (including monitored values) on a necessary optical level is exchanged via the network such as the LAN. Thereby, the attenuation level of the variable optical attenuator 13b is set. In this embodiment, the OSC signal is used for transmitting the monitored information. As shown in FIG. 8, one wavelength outside an amplification band of an optical amplifier is generally allocated to the OSC signal. The OSC signal plays a role in transmitting information between the optical amplifying repeaters 14a and 14b, which is essential in operation of a wavelength division multiplexing optical transmission system.

A monitored value of an output level of an optical amplifier 4a is collected by the supervisory controlling unit 8a and, thereafter, multiplexed and outputted by the OSC signal transmitter 22a. The OSC signal is multiplexed with the ASE light by the optical coupler 21a and inputted to the optical coupler 23b through an optical transmission line 9a. The OSC signal demultiplexed from the ASE light by the optical coupler 23b is inputted to the OSC signal receiver 24b. Thereafter, the information is transmitted to the supervisory controlling unit 8b. Thereby, in the optical amplifying repeater 14b, the monitored value of the output level of the optical amplifier 4a in the optical amplifying repeater 14a can be known. Therefore, in the supervisory controlling unit 8b, based on the output level (P0) of the optical amplifier 4a, an input level (P1) of an optical amplifier 4b and an optimum loss value (L) of the optical transmission line 9a, the attenuation level of the variable optical attenuator 13b can be calculated as described above. Thus, the variable optical attenuator 13b is set to have an optimum attenuation level.

As the flow of adjusting the optical transmission loss, it is required to establish the connection between the optical amplification function units 30a and 30b in the third exemplary embodiment described above. In this embodiment, in addition to the above, a connection between the OSC signal transmitter 22a and the OSC signal receiver 24b becomes essential.

In the third exemplary embodiment described above, the monitored information is collected by use of a separate network such as a LAN. On the other hand, in this embodiment, the monitored information is collected by multiplexing to the OSC signal. Thus, as a main effect of this embodiment, there is an effect that it is not required to construct a network separate from the optical transmission line, compared with the third exemplary embodiment. Particularly, if a distance between the optical amplifying repeaters is long, this embodiment is more advantageous since a transmission distance is limited by use of the LAN and the like. Moreover, since there is no influence of interference from the LAN and the like, a more reliable optical transmission system can be constructed.

Note that, needless to say, the present invention is not limited to the first to fourth exemplary embodiments described above. For example, the description was given by assuming that the optical amplifiers perform automatic level control (ALC) However, the optical amplifiers may perform automatic gain control (AGC) (gain constant control). Moreover, although the embodiments suitable for the present invention have been described above, the configurations described above may be used in combination or a part of the configurations may be changed.

As described above, the optical amplifying apparatus, the optical transmission system and the method thereof according to the present invention mainly achieve the following effects.

The present invention achieves an effect that the optical transmission loss can be adjusted without transmitting actual signal light to the optical transmission line, since the input level to the optical amplifier is adjusted by use of the ASE light. Moreover, the present invention achieves an effect that the optical transmission loss can be easily adjusted since time and equipment for transmitting the signal light are no longer required.

While this invention has been described in the connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical transmission system including a plurality of optical amplifying apparatuses connected through an optical transmission line, comprising:
   the optical transmission line for transmitting a signal light; and
   the optical amplifying apparatuses for amplifying the signal light, each of which includes
   an optical detecting unit for detecting an input level of an amplified spontaneous emission (ASE) light,
   an optical amplifying unit for amplifying the signal light,
   an optical attenuating unit for adjusting an attenuation level for the signal light, the optical attenuating unit being installed on an input side of the optical amplifying unit; and
   a supervisory controlling unit for supervising the input level of the ASE light, which is detected by the optical detecting unit,
   wherein the optical attenuating unit adjusts the attenuation level for the signal light, based on a difference between an output level of the ASE light outputted from the preceding optical amplifying apparatus and the input level of the ASE light inputted thereto,
   wherein the supervisory controlling unit communicates monitored information between respective optical amplifying apparatuses, and
   wherein each of the optical amplifying apparatuses includes a supervisory controlling unit by which ASE light information is provided directly from other ones of the supervisory controlling units.

2. The optical transmission system according to claim 1, wherein the optical detecting unit detects a total of optical power levels of the ASE light in a predetermined amplification band.

3. The optical transmission system according to claim 1, wherein the supervisory controlling unit receives the output level of the ASE light, which is outputted from the preceding optical amplifying apparatus, as monitored information, and supervises the output level.

4. The optical transmission system according to claim 1, wherein the optical attenuating unit variably adjusts the attenuation level based on the difference between the output level and the input level of the ASE light.

5. The optical transmission system according to claim 1, wherein the output level, of the ASE light is obtained by use of an optical supervisory channel (OSC) signal light.

6. The optical transmission system according to claim 3, wherein the supervisory controlling unit supervises the difference between the output level and the input level of the ASE light and variably adjusts the attenuation level of the optical attenuating unit based on the difference.

7. The optical transmission system according to claim 3, wherein the monitored information is transmitted through the optical transmission line as an optical supervisory channel (OSC) signal light.

8. The optical transmission system according to claim 5, further comprising:
   an OSC signal light receiving unit for receiving the OSC signal light,
   wherein the OSC signal light receiving unit transmits the output level of the ASE light to the supervisory controlling unit based on the OSC signal light received.

* * * * *